(12) United States Patent

Bohlander

(10) Patent No.: US 6,796,690 B2
(45) Date of Patent: Sep. 28, 2004

(54) LED LIGHT SOURCE

(75) Inventor: Richard A. Bohlander, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 1 day.

(21) Appl. No.: 10/097,944

(22) Filed: Mar. 14, 2002

(65) Prior Publication Data

US 2003/0174499 A1 Sep. 18, 2003

(51) Int. Cl.[7] ............................................... B64D 47/02
(52) U.S. Cl. ..................... 362/471; 362/470; 362/479; 362/490
(58) Field of Search ..................... 362/470, 471, 362/479, 490, 488, 219, 478, 545, 800, 231, 230, 331, 187, 184, 268

(56) References Cited

U.S. PATENT DOCUMENTS

| | | | | |
|---|---|---|---|---|
| 5,309,277 A | * | 5/1994 | Deck | 359/387 |
| 5,677,603 A | * | 10/1997 | Speirs et al. | 315/324 |
| 5,690,417 A | * | 11/1997 | Polidor et al. | 362/244 |
| 5,752,766 A | * | 5/1998 | Bailey et al. | 362/250 |
| 6,068,383 A | * | 5/2000 | Robertson et al. | 362/84 |
| 6,203,180 B1 | * | 3/2001 | Fleischmann | 362/471 |
| 6,290,368 B1 | * | 9/2001 | Lehrer | 362/187 |
| 6,357,889 B1 | * | 3/2002 | Duggal et al. | 362/84 |
| 6,402,339 B1 | * | 6/2002 | Mukogawa et al. | 362/184 |
| 2002/0181231 A1 | * | 12/2002 | Luk | 362/240 |

* cited by examiner

*Primary Examiner*—Thomas M. Sember
*Assistant Examiner*—Hargobind S. Sawhney
(74) *Attorney, Agent, or Firm*—Harness Dickey & Pierce P.L.C.

(57) ABSTRACT

An LED light source having an array of LEDs provides increased control of a light beam pattern while providing increased service life. The LEDs are selectively powered to control the light beam pattern, including, for example, shape, size, intensity and direction of the light beam pattern. A controller may provide manual or automatic control of the light beam pattern to thereby adjust the illumination area.

25 Claims, 6 Drawing Sheets

LED LIGHT SOURCE

FIELD OF THE INVENTION

The present invention relates generally to light sources, and more particularly to a system for controlling a plurality of light emitting diodes to produce different light beam patterns.

BACKGROUND OF THE INVENTION

Control of lighting is needed in many applications, and in particular, precise control of a light source may be desirable. For example, when multiple light sources are used to project light to different locations in close proximity to each other, precise light control is very important. One such application where precise control is very important is in mobile passenger cabins (e.g., aircraft, car or bus). In particular, light sources for these cabins are designed in an attempt to reduce the amount of stray light (i.e., light outside the illuminated area) emitted. This stray light is undesirable for many reasons, including for example, bothering other passengers within the cabin.

In general, including in many mobile passenger cabins, incandescent lights (e.g., reading lights) are used to provide lighting. These lights typically provide adequate illumination for reading (i.e., light provided to a general area), but are difficult to control. Specifically, control of light output shape, intensity or aiming is difficult. There is a compromise between light beam pattern size and shape, and a single illumination pattern is typically provided to meet all lighting situations for a particular application. In situations where a single illumination pattern is not acceptable, mechanical apertures are used to adjust pattern size and shapes, which may be variable or fixed. However, these mechanical components not only add complexity to design, but are often difficult and cumbersome to operate by a user. Further, aiming of a light beam also can be adjusted mechanically, which generally may be provided using a gimble type mount. However, again, the mount is awkward to adjust and requires the user to physically touch the light to adjust the aiming.

High Brightness light emitting diodes (LEDs) are now available that provide sufficient light intensity and full color output spectrum to allow for use in applications where incandescent lamps traditionally were the only option. The use of LEDs allows for the incorporation of additional features into light sources (i.e., fixtures), which are currently not possible using conventional incandescent lamps.

Thus, there exists a need to provide a system for electronically controlling LEDs to provide different light beam patterns from a light source, including for example, variable pattern size and shape, variable aiming and variable intensity of the illuminated pattern. It is also desirable for such a system to provide for selectable control by the user, which preferably may be programmable, depending upon the particular application and environment.

SUMMARY OF THE INVENTION

The present invention provides an LED light source that allows for increased control of a projected light beam, including light beam focusing and aiming. In general, the present invention provides for controlling white light and imaging onto a focal plane to produce a predetermined light pattern, which may be used, for example, as a reading light. The invention also reduces or eliminates glare or visible light outside the intended illumination area. The use of LEDs also provides for significant improvement in service life.

The LED light source of the present invention provides for increased control of a light beam, and in particular, the light beam pattern using an array of LEDs. With respect to controlling the light beam pattern, this may include, for example, adjustment of the light beam size, shape, intensity and aiming.

Specifically, an improved light source providing increased control of lighting constructed according to the principles of the present invention includes a plurality of light emitting diodes configured in an array and adapted to be selectively powered to provide different light beam patterns, which may include, for example, different shapes, sizes, and intensities, as well as control of light beam direction. The improved light source may include a color conversion component having a phosphor impregnated material adapted for energization by the light emitting diodes. Further, a collector lens for capturing light from the color conversion component and an objective lens for focusing the different light beam patterns may be provided. An aperture may be used to reduce or eliminate visible glare from the light source when viewed from outside the illumination area.

A programmable controller may be provided for controlling the different light beam patterns. This controller is adapted to provide different current levels to power the array of light emitting diodes and controls switches to activate different light emitting diodes within the array.

The present invention also provides, in combination with a mobile passenger cabin, a plurality of light sources providing illumination within the mobile passenger cabin. Each of the plurality of light sources includes a plurality of light emitting diodes configured in an array and adapted to be selectively powered to provide different projected light beam patterns. A control program may be provided that is adapted to control the plurality of light emitting diodes to provide the different projected light beam patterns. In particular, the control program may control, for example, the size, shape, intensity or projected direction of the light beam pattern. The control program is also adapted to control the current levels to power the plurality of light emitting diodes and to control switches to activate some of the plurality of light emitting diodes.

A method of controlling lighting using a plurality of light emitting diodes arranged in an array is also provided. The method includes selectively powering at least some of the plurality of light emitting diodes to control the pattern of a light beam produced by the plurality of light emitting diodes. Further, a phosphor impregnated member may be used to emit a wide spectrum white light when energized by the plurality of light emitting diodes. The light beam pattern may be shielded from direct view using an aperture.

Thus, the present invention provides an improved light source allowing for increased control of a projected light beam by selectively powering some of a plurality of LEDs arranged in an array. The light beam pattern is thereby controlled, which may include, adjustment of shape, size, intensity and direction of the light beam pattern, among others.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. Thus, although the present invention is described in connection with LEDs configured in a particular manner and controlled to provide different light beam patterns, it is not so limited, and other configurations and beam patterns are contemplated.

With respect to controlling a light beam, and in particular, controlling light beams in a mobile passenger cabin (e.g., cabin in an aircraft), arrangements for this controlled lighting further may be understood with reference to FIG. 1 by example. Thus, before further describing the invention, it is useful to generally understand lighting, and in particular, controlling light beams produced from light sources.

Figure 1A:
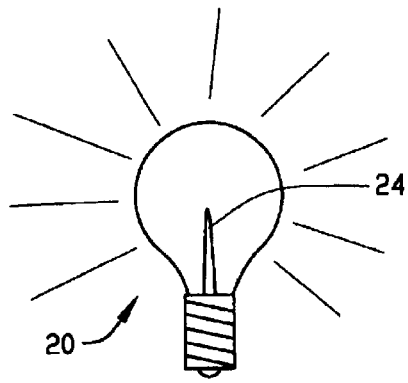
FIGS. 1(a) and 1(b) are elevation views of incandescent light sources.
Figure 1B:
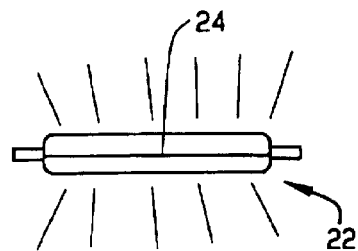

It is common to use incandescent lighting to provide illumination, for example, within mobile passenger cabins to allow for reading and other activities requiring light. As shown in FIGS. 1(a) and 1(b), incandescent lighting can take different shapes and forms. FIG. 1(a) illustrates a standard electric light bulb 20 and FIG. 1(b) illustrates a halogen bulb 22. Each of these bulbs typically includes a tungsten filament 24 that is heated to the point that it emits visible light (i.e., incandescence). Although these bulbs 20, 22 emit sufficient light for many applications, mechanical means (e.g., a shade reflector or deflector) may be needed to control the emitted light to provide a specific beam to a particular location. Other types of light sources also may be used to provide illumination, including, for example, fluorescent lights. Again, this type of lighting cannot easily be controlled (e.g., directed) without the use of mechanical or control means.

Figure 2:
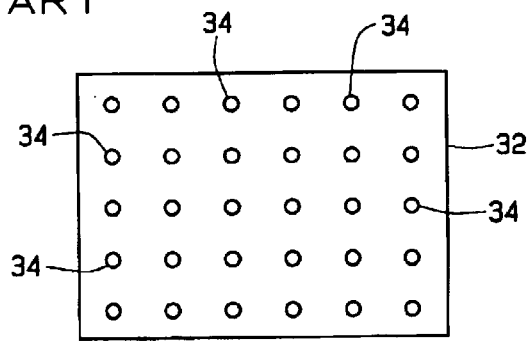
FIG. 2 is a plan view of an array of LEDs of an LED light source constructed according to the principles of the present invention.
Figure 3:
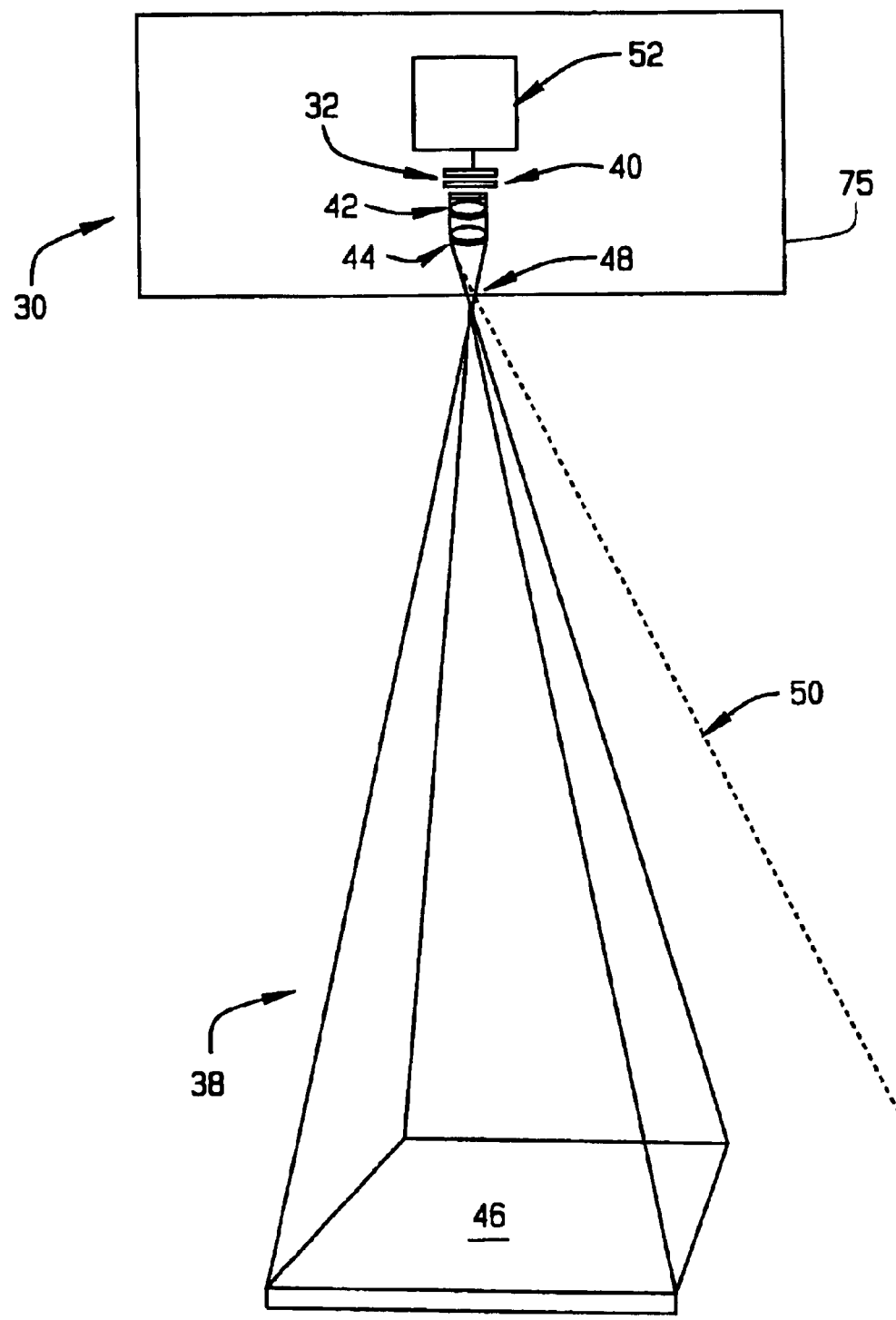
FIG. 3 is an elevation view of the LED light source of the present invention.
Figure 9:
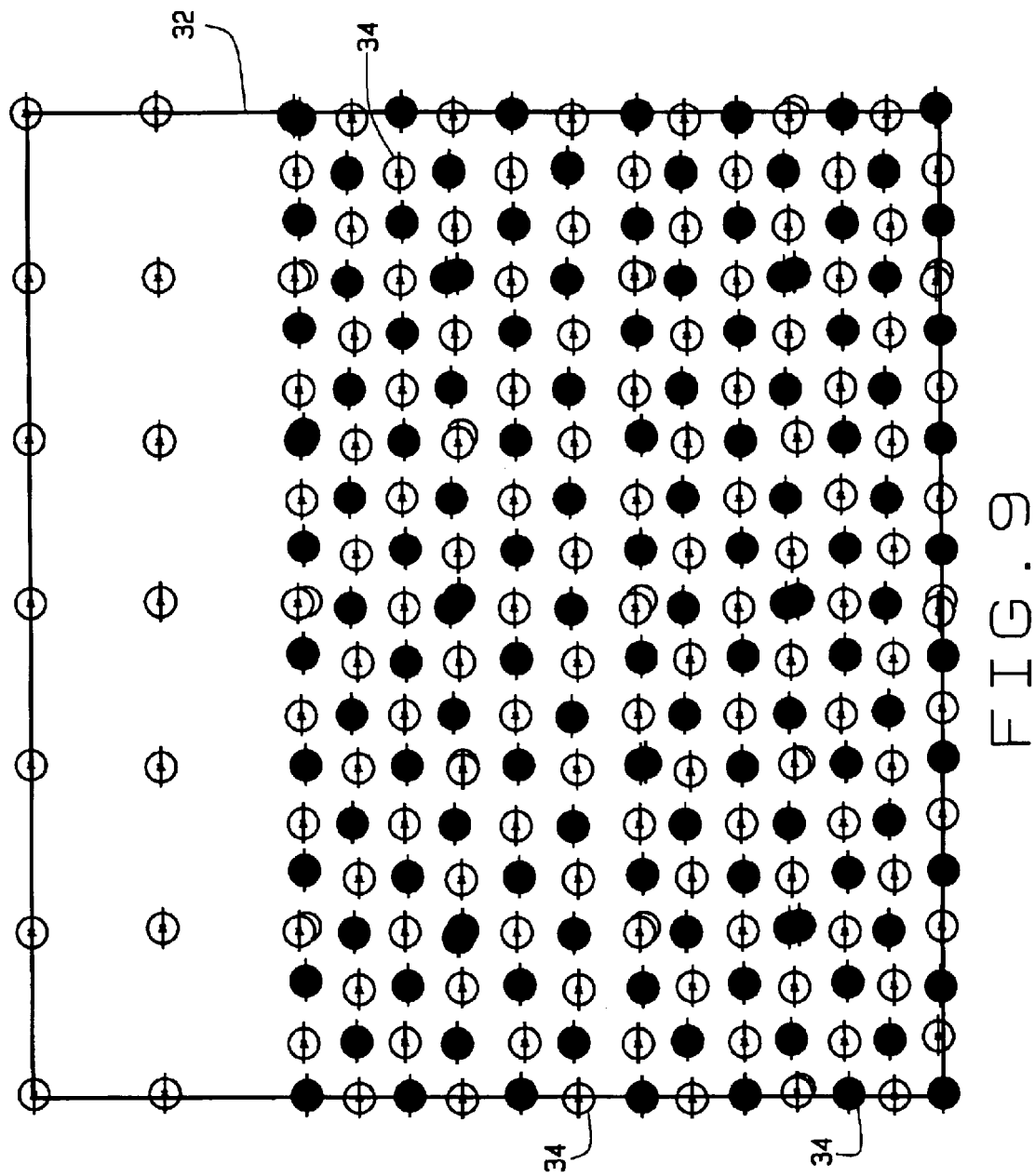
FIG. 9 is a schematic layout of an LED array of the present invention.

Having described exemplary light sources, including incandescent and fluorescent lights that may be used to provide illumination, the present invention provides an array of LEDs that allow for increased control of lighting, and in particular, of a beam of light that is produced therefrom. An LED light source 30 constructed according to the principles of the present invention is shown in FIG. 3. Generally, an LED array 32 shown in exemplary form in FIGS. 2 and 9, is constructed of plurality of LEDs 34 configured in a predetermined arrangement. For example, and as shown in FIG. 9, an array 32 of 19×15 LEDs 34, having a dimension of 0.7 inches by 0.7 inches may be provided, with groups of 7×9 LEDs 34 selectively activated at a time. Control of the individual LEDs 34 provides different light beam patterns as described in more detail herein. Essentially, an addressable array 32 of LEDs provides user selectable light patterns. It should be noted that other LED 34 configurations and arrangements are possible depending upon lighting requirements and the particular application.

Specifically, the LED light source 30 is a solid state electronically controlled light source (e.g., reading light) that uses LEDs 34 configured in the array 32 (i.e. LED array). The LED light source 30 is controlled by control electronics to vary a light beam pattern 38, including, for example, the pattern size, shape, aiming and/or intensity of the beam pattern.

The LED light source 30 includes the LEDs 34, optical components and a controller as shown in FIG. 3. Specifically, the array 32 of LEDs 34 is preferably constructed of individual LEDs 34 arranged in a specific pattern (e.g., 5 by 6 rectangular pattern as shown in FIG. 2) and provides for turning on and off individual LEDs 34 to affect the light beam pattern. The intensity of the LEDs 34 also may be adjusted. Control of the individual LEDs 34 provides for various combinations of LEDs 34 to be energized (i.e., selectively powered or activated), which results in different light beam patterns (e.g., size or shape).

Figure 8:
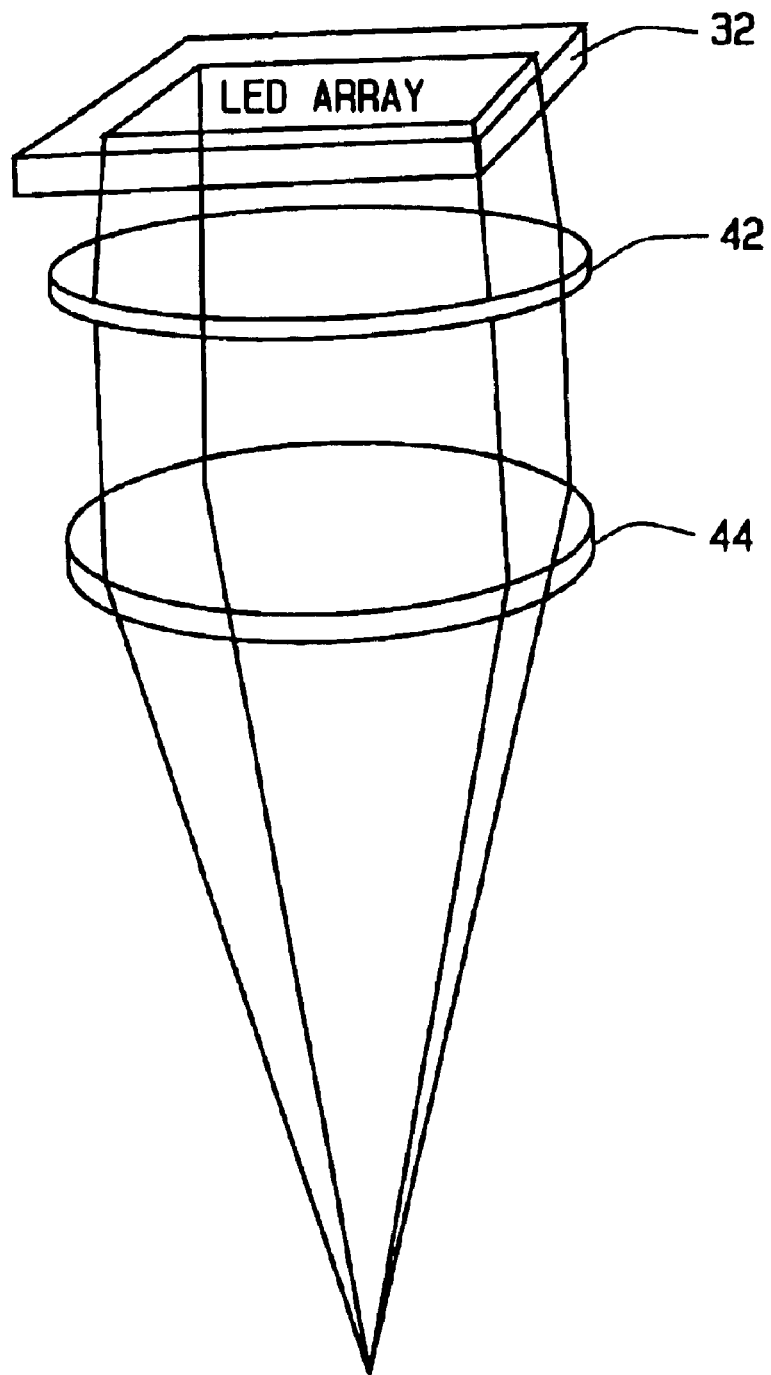
FIG. 8 is an exploded perspective view of the lenses of the LED light source of FIG. 3.

With respect to the optical components of the LED light source 30, these components are used to produce a white image (i.e., white beam of light) of the array 32 and project the image of the LEDs 34 that are energized onto an object (e.g., book) or focal plane. In particular, the optical components include a color conversion component 40. The color conversion component 40 is preferably a layer having a phosphor impregnated material (e.g., phosphor embedded silicon) that emits a wide spectrum white light when energized by the LEDs 34. It should be noted that specific color spectrums suited for particular applications can be produced through different phosphor combinations. A collector or condenser lens 42 (e.g., piano convex lens) is provided to capture the white light emitted from the phosphor impregnated material. An objective lens 44 is provided to focus the white light onto an illumination area 46 (i.e., focus the light beam pattern 38), which may be used to illuminate, for example, a book. The arrangement of the objective lens 44 may be more clearly seen in FIG. 8. Further, the white light from the objective lens preferably is directed through a small aperture 48 to reduce or eliminate glare 50 outside the illumination area 46 from the light source 30. It should be noted that the optical components are provided using any suitable component parts and may be constructed based upon the particular lighting needs (e.g., illumination area).

Figure 6:
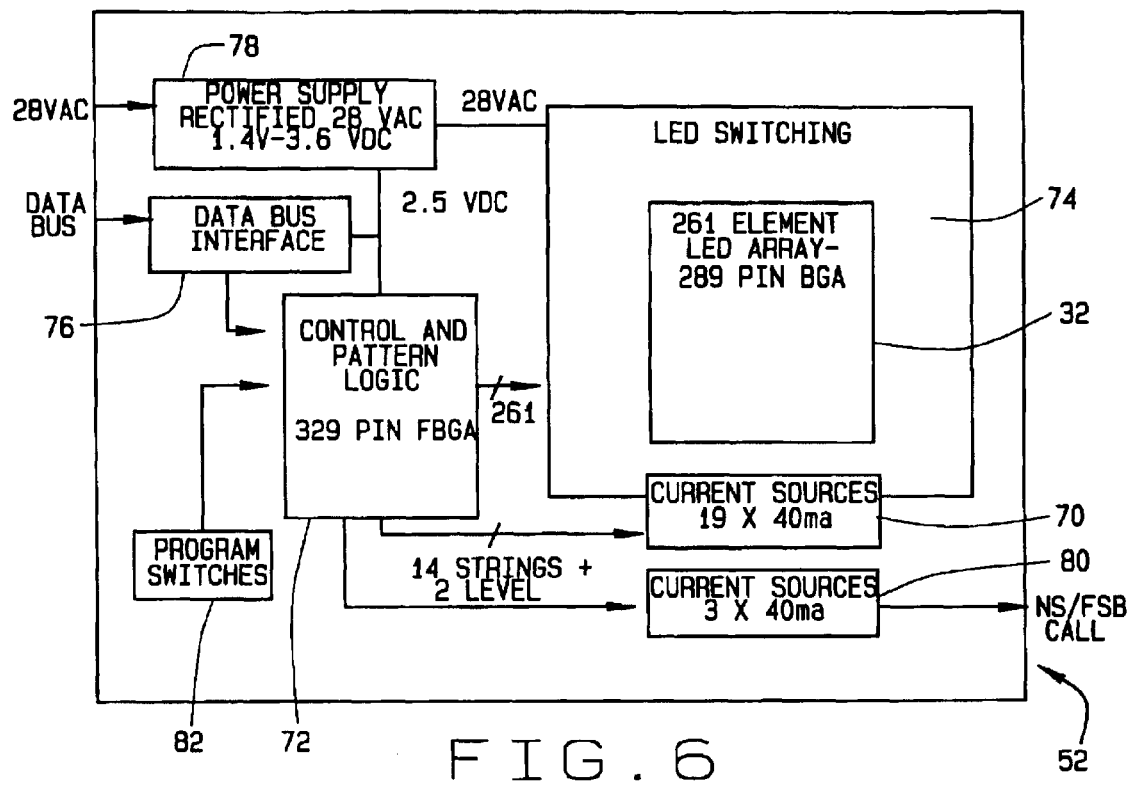
FIG. 6 is a schematic diagram of a controller of the present invention for controlling the LED light source.

An electronic controller 52 includes drive circuitry to provide various fixed current levels to power the LEDs 34. In operation, the electronic controller 52 adjusts the current level to specific LEDs 34 to provide the different light beam patterns. Solid-state switches are used to control which of the LEDs 34 are activated at a particular time. Specifically, and as shown in FIG. 6, the electronic controller 52 consists of constant current drivers 70, a field programmable gate array (FPGA) 72 or microprocessor, a switch matrix 74, a serial data bus interface 76, and if connected to an AC source, a full wave rectifier 78 with small DC power supply (e.g., 28 volts). In operation, the FPGA 72 and switch matrix 74 provide addressable control of the LED array 32, which provides the specific lighting patterns and aiming control. The FPGA 72 also provides the logic to decode data from the serial data bus. The electronic controller 52 assembly may also include three constant current outputs 80 to drive the No Smoking (NS), Fasten Seat Belt (FSB) and Attendant call lights.

Communication to the LED light source 30 is provided through the serial data bus. This serial bus is preferably used to transmit control commands to each LED light source 30 for selection of pattern type and aiming, as well as providing data to control the NS/FSB and attendant call light outputs. The address location of each LED light source 30 is determined and selected upon installation. This may be provided, for example, using three rotary type program switches 82 that are set upon installation to provide unique seat and row identification (e.g., Seat C, Row 39) and is preferably capable of up to 10 seat location and 99 row assignments.

It should be noted that depending upon the requirements of the particular application, the size of the array 32 and specific components implemented may be modified or adjusted accordingly.

Figure 4:
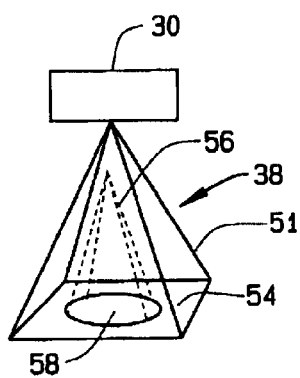
FIG. 4 is a top perspective view of different exemplary light beam patterns of the LED light source of the present invention.

In operation, the LED light source 30 of the present invention uses an array 32 of LEDs 34 and optical components to provide different light beam patterns. The light beam patterns are adjusted electronically and may be provided by manual operation (e.g., manually operated controls) or preprogrammed operation (e.g., computer program). Further, controls may be provided within the mobile passenger cabin to allow for adjustment of the light beam pattern by passengers therein. Thus, as shown in FIG. 4, the light beam pattern 38 may be adjusted to meet particular illumination requirements. For example, a first light beam pattern 51 may have a generally rectangular illumination area 54 and a second light beam pattern 56 may have a generally oval illumination area 58 using the same array 32 of LEDs 34.

Figure 7:
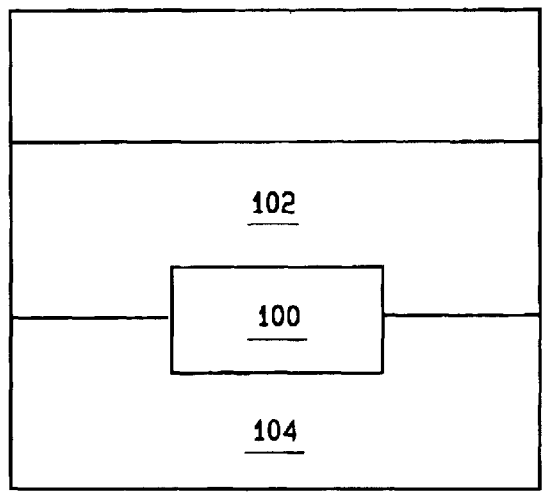
FIG. 7 is a block diagram showing exemplary light patterns provided by the present invention.

Specifically, a user preferably is provided with different selectable preprogrammed light patterns (e.g., 4 different patterns) configured for specific activities. In particular, and as shown in FIG. 7, a first illumination area 100 may provide a high intensity rectangular pattern for illuminating reading material or for other activities requiring close visual acuity. This pattern preferably may be aimed both forward and aft as well as side to side electronically by the user to accommodate changes in seating positions and locations (e.g., on an aircraft) of reading materials. A second illumination area 102 provides a pattern configured for use with a laptop computer, wherein the light pattern illuminates only the keyboard area, leaving the screen in a darkened area. This pattern is preferably adjustable forward and aft by activating specific groups of LEDs 34 in the array 32. A third illumination area 104, when activated, also preferably activates illumination area 102, and is configured to illuminate the table area for eating (e.g., in an aircraft) and providing illumination for general activities. This is preferably a fixed illumination pattern. A fourth illumination area 106 provides a general area low light level that illuminates the seat and floor areas and may be used, for example, to help seeing obstructions when entering and exiting the area in darkened cabin (e.g., in an aircraft), while minimizing disturbance to the adjacent passengers.

Controls for operating the LED light source 30 may be located either in the seat armrest or in the lower surface of the Passenger Service Unit 75 (PSU) above each passenger. The controls preferably include a push-button to select the pattern and directional push-buttons to allow aiming.

Figure 5:
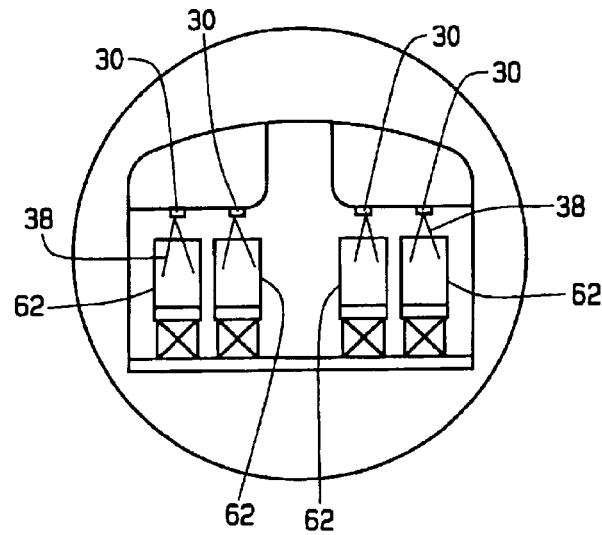
FIG. 5 is a cross-sectional view of a mobile passenger cabin having a plurality of LED light sources of the present invention therein.

Thus, in operation, the intensity and aiming of the illumination areas 54, 56, 100, 102, 106 preferably may be adjusted as needed. For example, and as shown in FIG. 5, a plurality of LED light sources 30, which may be part of reading light assemblies, may be provided within a mobile passenger cabin 60 (e.g. aircraft cabin) to allow controlled illumination of seats 62 therein and may be adjusted if seating configurations change or other requirements change (e.g., passenger lighting needs). Further, the light beam patterns 38 may be adjusted depending upon the location of the LED light sources 30 and the seats 62 to reaim illumination to the proper area for optimal use by passengers within the seats 62 (e.g., for use in reading), while minimizing glare to passengers in adjacent seats 62.

Essentially, an LED light source 30 consists of the LED array 32 and lenses 42, 44 together used to project an illumination pattern onto, for example, a working area. Different focal length lenses may be used to accommodate variation in installation heights if required. A separate LED light source 30 assembly is preferably provided for each seat 62. These assemblies mount directly into brackets integral to the PSU. Adjustment capability is preferably provided in the mounting brackets to allow for repositioning of the light forward and aft and allowing for different seat pitch configurations.

In one exemplary construction as shown in FIG. 9, an LED array 32 using a 17 inches×17 inches (289) ball grid provides electrical connection to a printed circuit board (PCB). In this construction, a 28 volt input power source is preferably used, and provides power for selectively powering blue Indium Gallium Nitride LEDs 34 having a Vf of 3.0 to 4.0 volts. This may provide, for example, a 7 watt maximum dissipation and 20 foot candle (fc) maximum illumination level. Further, a 0.9" by 0.9" Aluminum Nitrate Substrate is preferably provided with 261 LED dies spaced on 0.035 inch centers. The substrate is approximately 0.9 inches square with LEDs 34 centered on the substrate. A UV stabilized optically clear encapsulant may be provided to protect the LED dies and wire bonds. YAG Phosphor Impregnated Silicon or other phosphors embedded in a translucent medium may be used as an overlay to allow for different color lighting options. The specific characteristic for such an LED array 32 are shown below in Table 1.

TABLE 1

| | adjustment inches | |
|---|---|---|
| pattern | side | fwd-aft |
| 18 × 18 | fixed | fixed |
| 12 × 18 | fixed | fixed |
| 6 × 18 | fixed | 6" |
| 6 × 9 | 9" | 6" |

Thus, the present invention provides an LED light source 30 that provides electronic control of a light beam to provide different light beam patterns with different illumination areas. By controlling the specific LEDs 34 that are energized, as well as, the energization level (i.e., current level) of the LEDs 34, the light beam pattern may be adjusted using manual or preprogrammed controls. Further, the LED light source 30 reduces maintenance cost and minimizes time that the mobile passenger cabin is out of service when reconfiguring seating arrangements. Passenger comfort is also improved by allowing a user to adjust the light beam pattern to fit their particular needs. Passengers that are seated adjacent to another passenger who has a reading light on, will no longer have light falling into their seat area, or be annoyed by light glare (e.g., during in-flight movies).

Although the present invention has been described in connection with specific components configured in a particular manner (e.g., a specific array), it is not so limited, and the LED light source of the present invention may be modified based upon the particular illumination requirements. For example, the size of the array, the types of LEDs used, the color of the light beam and control electronics may be modified based upon illumination requirements (e.g., different mobile passenger cabins). Further, a simplified variable pattern LED light source may be provided. This LED light source may use a 70 LED array to provide a fixed pattern reading light. The optical design includes lenses to project the light from the array onto the focal plane as described herein. Lenses of different focal lengths can accommodate differences in mounting heights. The reading light would be mounted to the PSU with brackets that would provide aiming adjustments for seat pitch variations. The electronic controller may consist of an LED array, constant current drivers, and if required a 28 VAC full wave rectifier. A switch, group of switches or other device may be used by the passenger to turn the LED light source 30 on and off and provide aiming control. The LED light source may be further modified with the electronic controller consisting of an LED array and constant current sources.

Figure 10:
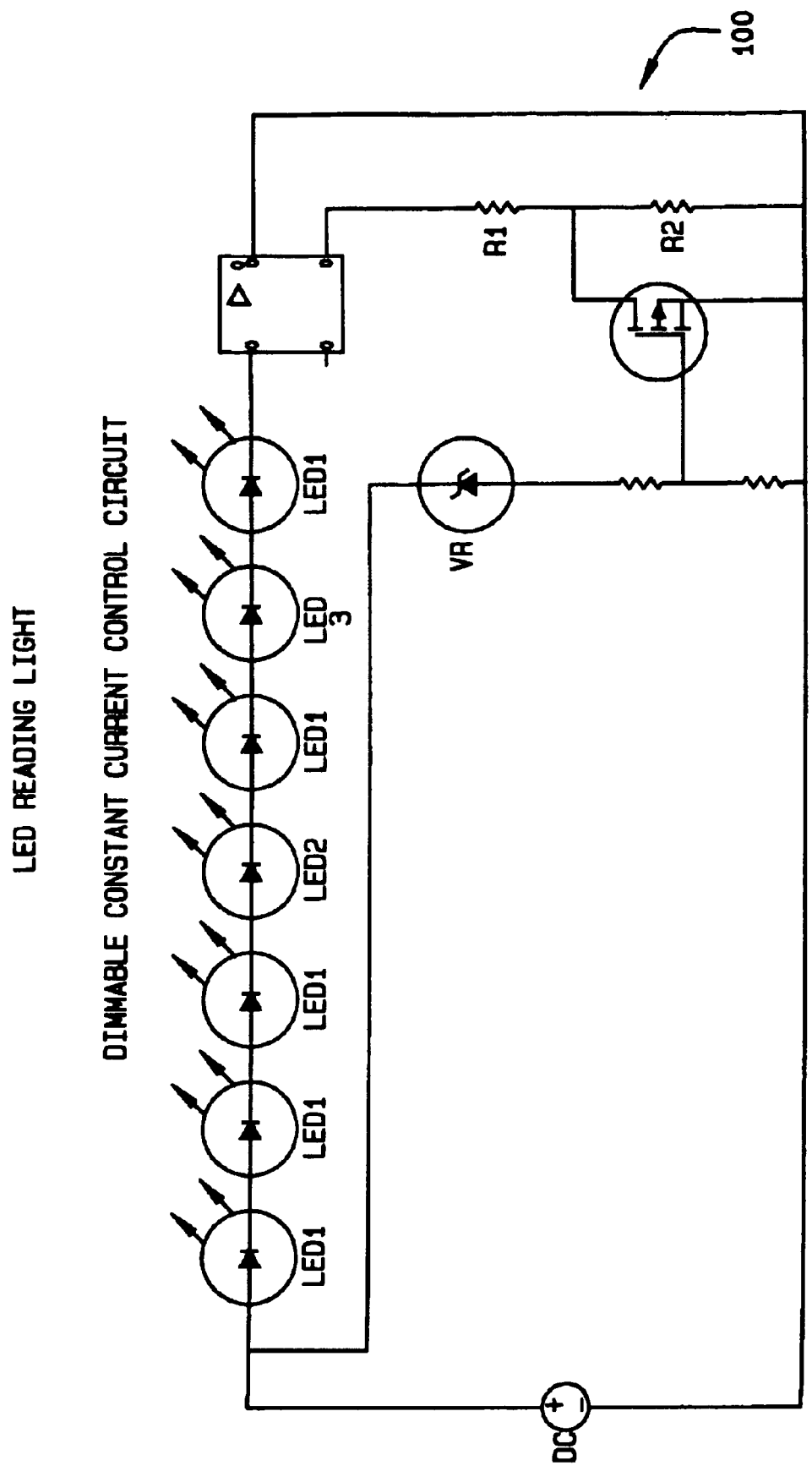
FIG. 10 is a schematic diagram of an exemplary dimming circuit of the present invention.

Other features and controls may be added as desired or needed. For example, and as shown in FIG. 10, a dimmable constant current control circuit 100 may be included to allow for dimming operation.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An improved light source providing increased control of lighting, the improved light source comprising:
   a plurality of light emitting diodes configured in an array;
   a collector lens for capturing white light emitted from the diodes; and
   a controller to selectively power groups of the plurality of light emitting diodes to provide different light beam patterns.

2. The improved light source according to claim 1, further comprising a color conversion component.

3. The improved light source according to claim 2, wherein the color conversion component comprises a phosphor impregnated material energized by the light emitting diodes.

4. The improved light source according to claim 1, further comprising an objective lens for focusing the different light beam patterns.

5. The improved light source according to claim 1, further comprising an aperture for shielding the light so that glare is not seen from an objective lens.

6. The improved light source according to claim 1, further comprising a programmable controller for controlling the different light beam patterns.

7. The improved light source according to claim 6, wherein the programmable controller provides different current levels to power the array of light emitting diodes.

8. The improved light source according to claim 7, further comprising switches to control activation of different light emitting diodes within the array.

9. The improved light source according to claim 1, wherein the different light beam patterns comprise different shapes.

10. The improved light source according to claim 1, wherein the different light beam patterns comprise different sizes.

11. The improved light source according to claim 1, wherein the different light beam patterns comprise different intensities.

12. The improved light source according to claim 1, wherein the different light beam patterns are directed in different directions.

13. The improved light source according to claim 1, further comprising an overlay providing different light colors.

14. In combination with a mobile passenger cabin, a plurality of light sources providing illumination within the mobile passenger cabin, each of the plurality of light sources comprising:
   a plurality of light emitting diodes configured in an array;
   a collector lens for capturing white light emitted from the diodes; and
   a controller to control the plurality of light sources and selectively power at least some of the plurality of light emitting diodes to provide different projected light beam patterns to illuminate specific areas within the mobile passenger cabin.

15. The plurality of light sources according to claim 14, further comprising a control program adapted to control the plurality of light emitting diodes to provide the different projected light beam patterns.

16. The plurality of light sources according to claim 14, wherein the control of the plurality of light emitting diodes comprises controlling at least one of the size, shape, intensity or projected direction of the light beam pattern.

17. The plurality of light sources according to claim 15, wherein the control program controls the current levels to power the plurality of light emitting diodes and controls switches to activate some of the plurality of light emitting diodes.

18. A method of controlling lighting using a plurality of light emitting diodes arranged in an array, the method comprising the step of:
   selectively powering at least some of the plurality of light emitting diodes;
   configuring a controller to control the pattern of a light beam produced by the selective powering of at least some of the plurality of light emitting diodes; and
   controlling the light beam pattern using an aperture.

19. The method according to claim 18, further comprising using a phosphor impregnated member to emit a wide spectrum white light when energized by the plurality of light emitting diodes.

20. A light source providing increased control of lighting, the light source comprising:
   a plurality of light emitting diodes configured in an array;
   a collector lens for capturing white light emitted from the diodes; and
   a controller to selectively power groups of the plurality of light emitting diodes to provide different light beam patterns selectable from a plurality of preprogrammed light beam patterns.

21. The light source according to claim 20, wherein the selectable preprogrammed light beam patterns are configured to provide at least one of a selectable pattern type and a selectable aiming.

22. The light source according to claim 20, further comprising a user control for selecting one of the preprogrammed light beam patterns.

23. The light source according to claim 22, wherein the user control is provided within a mobile passenger cabin for activation by a user to select a preprogrammed light beam pattern.

24. The light source according to claim 20, wherein the plurality of selectable preprogrammed light beam patterns comprise one of a rectangular light pattern, a light pattern for illuminating a keyboard of a computer without illuminating the screen, a general illumination pattern and a lower illumination pattern for illuminating a seat and floor area around a user.

25. The light source according to claim 24, wherein the controller controls the aiming of the light pattern based upon a user selected input.

* * * * *